Patented Jan. 30, 1940

2,188,889

UNITED STATES PATENT OFFICE 2,188,889

CONDENSATION PRODUCT AND METHOD

Edwin T. Clocker, Bethlehem, Pa.

No Drawing. Application September 26, 1938,
Serial No. 231,759

21 Claims. (Cl. 260—414)

My invention relates to methods of producing an improved colored condensation product suitable for use in resins, lacquers, paints, varnishes, enamels, plastic masses, dispersing, wetting, and softening agents, and for other similar purposes, and to the new product so produced.

This application is a continuation in part of my copending application Serial No. 165,898, filed September 27, 1937, which is in turn a continuation in part of my copending applications Serial No. 759,086, filed December 24, 1934, and Serial No. 117,243, filed December 22, 1936, all for Condensation product and method. Serial No. 759,086 includes the generic claims and certain species relating to the condensation of an acyclic olefinic acid, having less than ten carbon atoms in the carbon chain, or its ester, with a nonconjugated unsaturated nonhydroxylated aliphatic acid having from ten to twenty-four carbon atoms in the carbon chain, or a salt or ester thereof. Serial No. 117,243 relates particularly to the maleic species. Serial No. 165,898 relates to salts and esters of the condensation product. Serial No. 165,899, filed September 27, 1937, for Condensation product and method includes the subject matter relating to recondensation. Serial No. 165,900, filed September 27, 1937, for Coating product and method, is concerned particularly with coating. Serial No. 235,252, filed October 15, 1938, for Condensation product and method, is directed particularly to condensation with oleic acid and its compounds. Serial No. 231,760, filed Sept. 26, 1938, for Condensation product and method is directed to water insoluble metallic salts. Serial No. 231,761, filed Sept. 26, 1938, for Oily dispersion material covers oils, fats and waxes emulsified by the condensation product of the invention.

A purpose of my invention is to produce a colored condensation product by condensing an acyclic olefinic acid having less than ten carbon atoms in its carbon chain with one of the group consisting of nonconjugated unsaturated nonhydroxylated aliphatic acids having from ten to twenty-four carbon atoms in their carbon chains, nonhydroxylated salts thereof and nonhydroxylated esters thereof or similar compounds, and causing the acidic condensation product to combine with a basic dyestuff such as a basic dye or its dye base.

A further purpose is to condense an acyclic olefinic acid having less than ten carbon atoms in its carbon chain with an oil predominantly consisting of glycerides of linoleic and oleic acids, with or without glycerides of linolenic acid, such for example as an oil of the linseed or perilla type, and to combine the condensation product with a basic dyestuff.

A further purpose is to produce colored varnishes by combining a basic dyestuff with the acidic group of the condensation product of an acyclic olefinic acid having less than ten carbon atoms in its carbon chain with a nonconjugated unsaturated nonhydroxylated drying oil, and with or without the addition of synthetic or natural resins. The basic dyestuff may be added directly to the condensation product or in solution in a soluble solvent.

A further purpose is to condense maleic anhydride or the like with a nonconjugated drying oil such as linseed oil and then to react the condensation product with a basic dyestuff such as a basic dye or its dye base.

A further purpose is to condense an acyclic olefinic acid having less than ten carbon atoms in its carbon chain with a material of the type of linseed oil, to satisfy the acidic groups of the condensation product partially by a basic dyestuff, thus bringing out color, and to satisfy the acidic groups partially with a drier metallic compound, thus facilitating drying of the colored condensation product.

A further purpose is partially to satisfy with a basic dyestuff, the acidic groups of the condensation product of an acyclic olefinic acid having less than ten carbon atoms in its carbon chain with the carbon chain of a nonconjugated unsaturated nonhydroxylated fatty oil such as olive, linseed or perilla, and partially to satisfy the acidic groups of the condensation product with a metallic oxide or hydroxide or the like which will form a water soluble colored compound, capable of emulsifying oils, fats and waxes and of aiding in the suspension of pigments. Likewise this material may be used as a colored wetting or softening agent in the textile, leather, paper, printing ink and rubber industries, or as a colored bodying agent in the polishing, cutting and cosmetic industries, being capable of admixture with other oils, fats and waxes and of dispersing the mixture.

A further purpose is to disperse a colored varnish, paint, or lacquer vehicle, and desirably also a paint, varnish or lacquer resin, in water or a similar medium for coating purposes or the like by means of a soluble-salt-and-basic-dyestuff reaction product of the condensation product of maleic anhydride or the like and a nonconjugated unsaturated nonhydroxylated fatty oil or the like.

Further purposes appear in the specification and in the claims.

It has been known for some time that maleic anhydride or substances yielding maleic anhydride will condense with carbon chain compounds containing a conjugated system of double bonds. For example, Morrell, Marks and Samuels in British Patent No. 407,957, disclose a condensation of maleic anhydride with tung oil, a conjugated compound.

I have discovered that, under suitable conditions, maleic anhydride and compounds which behave similarly as discussed below, will react with nonconjugated unsaturated nonhydroxylated fatty oils and acids or similar compounds, having from ten to twenty-four carbon atoms in the carbon chain, and the condensation product thus obtained may be given any one of a wide variety of colors with a moderate consumption of dyestuff.

To produce the maleic condensation product, the maleic grouping must be present in condensable form, preferably as maleic anhydride. The condensation is of course obtained from any of the compounds which yield maleic anhydride and the like, such as malic acid, fumaric acid, maleic acid, aconitic acid or citric acid, if subjected to the conditions under which maleic anhydride is produced. The production of maleic anhydride from such other acids is well known in the art (Bernthsen, Textbook of Organic Chemistry (1923), pages 250–256). Instead of maleic anhydride, an acid ester of maleic acid, or a substituted maleic acid having less than ten carbon atoms in its carbon chain may be used.

Wherever reference is made herein to maleic anhydride, it will be understood that I include substances which yield maleic anhydride if subjected to the conditions at which maleic anhydride is produced. I also include substituted maleic acids having less than ten carbon atoms in their carbon chains, and other equivalents.

Investigation of a large number of compounds has shown that the condensation with a nonconjugated unsaturated nonhydroxylated aliphatic acid having from ten to twenty-four carbon atoms in the carbon chain is generally characteristic of acyclic olefinic acids having less than ten carbon atoms in the carbon chain. These acyclic olefinic acids may contain acid groups on one or both sides of the ethylene linkage. Such olefinic compounds are mono-substituted when they contain only one acid group; for example crotonic acid. Such olefinic compounds are di-substituted when they contain two acid groups; for example maleic anhydride, citraconic anhydride, maleic acid.

The longer the carbon chain of the acyclic olefinic acid, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain. In all cases where I refer in the specification to less than ten carbon atoms in the carbon chain of the acyclic olefinic acid, it will be understood that a more vigorous reaction is obtained with acids having less than seven carbon atoms in the carbon chain, and a still more vigorous reaction with acids having less than five carbon atoms in the carbon chain. These latter groups (less than seven and less than five) are to be taken as expressly included, although not specifically mentioned, because of a desire to shorten the specification.

As explained herein, in order to avoid a mere esterification of alcohol groups, as distinguished from a condensation at the double bond, the oil or similar compound should be nonhydroxylated. Where necessary, precautions should be used to avoid hydroxylation by hydrolysis or otherwise. As well known in the art, in order to prevent or minimize hydrolysis, the reacting components should be reasonably dry, and water formed by decomposition of a reacting ingredient during the reaction should be removed. For example, if maleic acid (as distinguished from the anhydride) is caused to react with an oil or similar compound, it is preferable to use a relatively high temperature to cause rapid reaction, and it is preferable to permit elimination of the water formed by decomposition of the maleic acid into maleic anhydride, as by permitting distillation and avoiding refluxing. Where maleic anhydride or a similar compound not producing water by decomposition is to be used, the desirability of avoiding refluxing of course ceases.

Condensation between maleic anhydride or the like and the carbon chain of a hydroxylated aliphatic acid, salt, or ester will only take place after esterification is complete, and in case maleic anhydride or the like in excess of that consumed by the esterification is present in contact with the esterified hydroxylated aliphatic acid, salt or ester under the proper conditions.

The esterification of course produces a change in properties, and the condensation product of a hydroxylated aliphatic acid, salt or ester can in general be given properties comparable with those of the condensation product of a nonhydroxylated aliphatic acid, salt, or ester, only by destroying the esterification of the maleic anhydride or the like, as by hydrolysis.

Due to the difficulty in obtaining a condensation reaction between maleic anhydride or the like and a nonconjugated unsaturated hydroxylated aliphatic acid having from ten to twenty-four carbon atoms in the carbon chain, due to the change in properties caused by esterification, and due to the difficulty of decomposing the ester, the claims have generally been drawn to exclude hydroxylated aliphatic acids, salts and esters. This means that such acids, salts and esters are not sufficiently hydroxylated to interfere by esterification with the condensation.

In those cases where the claims do not exclude hydroxylated aliphatic acids, salts and esters, it will be understood that more than mere esterification is intended—there should be condensation with the carbon chain of the acid, salt or ester. A typical hydroxylated fatty oil is castor oil.

A wide variety of nonconjugated unsaturated nonhydroxylated fatty acid materials having from ten to twenty-four carbon atoms in the carbon chain may be employed. Esters of fatty acids with mono-, di- or tri-hydric alcohols, for example glyceryl or glycol esters, are particularly desirable. The free fatty acids are also used. Salts of the fatty acids (soaps) are likewise employed.

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to a glyceryl group.

As examples of the type of nonconjugated unsaturated nonhydroxylated aliphatic acids having from ten to twenty-four carbon atoms in the carbon chain which I may use, I suggest oleic, linoleic, linolenic, clupanodonic and undecylenic. The esters of the nonhydroxylated fatty acids are either glyceryl esters, which form oils such as corn, olive, cotton seed, peanut, linseed, sunflower, safflower, perilla, hemp seed, walnut seed, soya bean, rape seed, tomato seed, neat's foot, lard, codliver, cod, burbet, salmon, menhaden, and many others, all nonconjugated unsaturated non-hydroxylated fatty oils; or esters of other alcohols, for example glycol esters. It will furthermore be understood that mixtures of various esters, or of the esters and the free fatty acids, or of salts of the acids, may be employed if desired.

Most of the oils referred to above, such as oils of the linseed and perilla types, predominantly consist of glycerides of linoleic and oleic acids; that is, a mixture of glycerides of linoleic and oleic acids, containing more of linoleic and less of oleic or more of oleic and less of linoleic in a particular case, is the predominant constituent of said oils. In the case of an oil such as olive oil, glycerides of linoleic acid are of course subordinate to glycerides of oleic acid.

The question of whether the free acid or the ester or the salt is used is immaterial from the standpoint of the condensation reaction because the condensation reaction with the maleic anhydride or the like appears to involve the carbon chain at an intermediate point between its ends, rather than the carboxyl group or neutralized carboxyl group at the end of the chain. Of course, the character of the product will vary depending upon whether the acid, ester or salt is used.

In the condensation, I will desirably employ one molecular equivalent of nonconjugated unsaturated nonhydroxylated aliphatic acid or the like to one molecular equivalent of acyclic olefinic acid and subject the mixture to a temperature of between 150° C. and 300° C. (more desirably between 180° C. and 260° C.) and preferably also to high pressure to facilitate the reaction. The temperature will in some cases be somewhat above 300° C. if the reacting components can stand such high temperature. Pressure will desirably be applied by simply confining the reaction components between the walls of some vessel such as a pressure autoclave and then heating the reaction components. Under these conditions the pressure will equal the vapor pressure of the reacting components. Pressure can also be applied in any other suitable way, as by pumping the reaction components into the vessel or introducing an inert gas under pressure. I have used pressures up to 300 pounds per square inch with success. Of course the desirable pressure will vary with the individual reaction.

The time of reaction will depend upon the temperature, the pressure, the concentration and the character of the reactants. In general where the reactions are carried out under atmospheric pressure, the minimum times of reaction for particular temperatures of reaction are:

| Temperature | Minimum time |
| --- | --- |
| 150° C | Several hours. |
| 200° C | One hour. |
| 230° C | Thirty minutes. |
| 250° C | Twenty minutes. |
| 300° C | Ten minutes. |

Naturally to assure results at any of these temperatures, the period of reaction will be at least 2 or 3 times the minimum.

A suitable catalyst can be used to accelerate the reaction and to increase the yield. I do not, however, find that a catalyst is necessary. The reaction may be carried out in the presence of suitable solvents, although this is not usually necessary.

In ordinary practice I prefer not to use sufficient acyclic olefinic acid having less than ten carbon atoms in the carbon chain to saturate all of the double bonds in the fatty acid or fatty oil, etc., having from ten to twenty-four carbon atoms in the carbon chain. The condensation product thus ordinarily has an iodine value. Generally it is sufficient to saturate one-sixth to one-third of the double bonds in the fatty acid, fatty oil, etc. Thus in olive oil one-third of the double bonds (one) is ordinarily saturated, and in linseed oil one-sixth (one). But in individual cases it may be desirable to saturate more ethylene linkages in the fatty acid or fatty oil, and even to completely saturate them. To saturate all of the ethylene linkages in linseed oil, six molecular equivalents of acyclic olefinic compound having less than ten carbon atoms in the carbon chain are caused to react with one molecular equivalent of linseed oil.

Examples 1 to 5 given below, clearly indicate the way in which my improved condensation product is obtained:—

Example 1

In a pressure autoclave, 180 parts by weight of raw alkali-refined linseed oil are mixed with 20 parts by weight of maleic anhydride. The temperature is maintained at from 230° C. to 260° C. for one hour, a pressure of about 30 pounds per square inch developing. The reaction can be obtained satisfactorily at 150° C., but is much slower at this low temperature, and the temperature may be raised to as much as 300° C. or even somewhat higher, but a high temperature may cause some difficulty due to carbonization. After cooling, the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of cellulose derivatives such as nitrocellulose in all proportions. The iodine value is 141.4, as against 190.0 for the original linseed oil. The saponification value is 288 and the acid value is 52.9, in the presence of ethyl alcohol.

Example 2

Into a three-neck flask, equipped with a thermometer, mechanical stirrer and reflux condenser, 200 parts by weight of distilled oleic acid and 60 parts by weight of maleic anhydride are placed and heat is applied until the temperature of the mixture reaches 180° C.

The temperature is gradually raised from 180° C. to 250° C. over a period of one hour, during which time the amount of maleic anhydride condensed by the reflux progressively diminishes. The temperature is maintained at 250° C. to 260° C. until no more maleic anhydride appears to condense under the reflux. The temperatures given are those found best for carrying out the reaction, although temperatures between 150° C. and 300° C., or even somewhat higher have been used.

The condensation product is soluble in ethyl alcohol, ether, xylene, carbon tetrachloride and solutions of cellulose derivatives such as nitrocellulose, but is substantially insoluble in petroleum hydrocarbons and fatty oils.

Example 3

To 180 parts by weight of linseed oil are added 25 parts by weight of citraconic anhydride (a substituted maleic anhydride) and the mixture is heated in a three-neck flask, equipped with a reflux condenser, at about 250° C. for about three-quarters of an hour. At the end of this period, no further citraconic anhydride appears to condense under the reflux, indicating completion of the reaction. As a precaution, heating is continued for about 15 minutes longer. The reaction product is less viscous than the maleic condensation product of linseed oil obtained in Example 1, but has the same properties otherwise.

Example 4

A mixture of 25 parts by weight of linseed oil and 2.4 parts by weight of crotonic acid (an acyclic olefinic acid) are heated under pressure in an autoclave at about 250° C. for about two hours. The condensation product has similar properties to the maleic-linseed oil condensation product obtained in Example 1 as respects solubility above noted, and dispersing power, drying action and adherence to metals, noted below.

Example 5

A mixture of 900 parts by weight of linseed oil and 112 parts by weight of acid methyl maleate (a maleic acid compound having a single free acidic group) are heated under pressure at above 250° C. for about 2 hours.

My novel condensation product may be made with nonconjugated unsaturated nonhydroxylated drying, semidrying and nondrying fatty oils having from ten to twenty-four carbon atoms in the carbon chain, or mixtures of the same, and the characteristics of the products are, to some extent, dependent upon the character of the oils or the like employed in the reaction. Where oils are used in the present invention, they will in most cases be oils predominantly consisting of glycerides of linoleic and oleic acids, that is, the predominant constituent will be a mixture of glycerides of these two acids, with or without important amounts of glycerides of linolenic and other nonconjugated fatty acids.

Salts of the condensation product of the present invention with basic dyestuffs produce very desirable colored varnishes and lacquers. The condensation product of maleic anhydride or the like and a nonconjugated unsaturated nonhydroxylated drying oil is preferably used, with or without the addition of a synthetic or natural resin in addition to the basic dyestuff. The acidic group of the acyclic olefinic acidic condensation product appears to combine with the basic group of the basic dyestuff. The reaction may be brought about directly or in the presence of a suitable solvent.

Example 6

A solution of one part by weight of Victoria blue dye base, Color Index No. 729, in 10 parts by weight of hot toluene is mixed with 100 parts by weight of the maleic anhydride condensation product of Example 1. The blue color of the dye is developed by the acidic group of the condensation product. By the addition of driers, as noted below, the product may be dried to a transparent colored film. Any of the products of Examples 2 to 4 may be used instead of the product of Example 1.

In the practice of the invention, basic dyestuffs may be used which are basic dyes, or which are the dye bases of basic dyes.

Some of the basic dyestuffs which may be used for example instead of Victoria blue to produce colored lacquers are—

Red

Magenta, Color Index No. 677.
Safranine, Color Index No. 841.
Rhodamine, Color Index No. 749.
Toluidine red, Color Index No. 69.

Violet

Crystal violet, Color Index No. 681.
Paraphenylene violet, Color Index No. 858.

Blue

Methylene blue, Color Index No. 922.
Victoria blue, Color Index No. 729 (already mentioned).
Night blue, Color Index No. 731.
Paraphenylene blue, Color Index No. 863.

Yellow

Leather yellow, Color Index No. 793.
Chrysoidine, Color Index No. 20.

Green

Malachite green, Color Index No. 657.
Brilliant green, Color Index No. 662.
Azine green, Color Index No. 834.

Brown

Bismark brown, Color Index No. 332.

Experiments indicate that the acidic group of the condensation product has the unusual property of developing the color more efficiently than the fatty acid acidic group. By this it is meant that ordinarily a particular intensity of color is produced with less dye where the basic dyestuff is combined with the acid group of the acyclic olefinic acid, than when the basic dyestuff is, for example, combined to the ordinary carboxyl group of the fatty acid present in the fatty oil.

In many cases it will be desirable to satisfy only part of the acid groups of the condensation product by the basic dyestuff. Under such conditions, the remaining acid groups can to advantage be left unsatisfied or can participate in reactions which impart desirable properties to the colored condensation product. There are two ways in which a plurality of acidic groups may be introduced into the molecule of the condensation product. One way is to condense the fatty acid or fatty oil with a di-basic or other poly-basic acyclic olefinic acid like maleic acid or maleic anhydride. Another way is to produce condensation at two or more ethylene linkages in a nonconjugated unsaturated nonhydroxylated fatty oil or the like, introducing either a monobasic or poly-basic acyclic olefinic acid having less than ten carbon atoms in the carbon chain at the respective ethylene linkages.

The acidic compound of the condensation product of the present invention combined with a basic dyestuff, exhibits very tenacious adherence to metals, thus especially suiting the product of the invention as a base color or dip for metallic objects. The property of adherence to metal is exhibited by the following examples:

Example 7

With 200 parts of the maleic anhydride linseed oil condensation product of Example 1, one part by weight of Victoria blue dye base in 10 parts by weight of hot toluene is mixed, and soluble driers are added to the extent of about 0.03% cobalt, 0.05% manganese and 0.5% lead in the form of oxides or other salts which will combine with the acid group. The material is then painted or sprayed on one half of a polished zinc plate, and the coating is allowed to air dry for 48 hours.

The colored film adheres very tenaciously to the metallic surface, and, if the film is removed by a solvent, the surface to which the film has been attached shows a slight etching effect while the surface of the zinc which is not coated is unaffected. The etching effect appears to be due to the action of the acidic group of the maleic condensation product on the metal.

The property of firm adherence to metal surfaces is exhibited with all of the ordinary structural and coating metals, such as zinc, lead, tin, copper, iron, aluminum, chromium, cadmium, etc., and their various alloys such as steel, nichrome, brass, bronze, zinc die cast metal, etc. An acidic compound of the maleic anhydride condensation product of linseed oil with a basic dyestuff dries much more quickly on copper than linseed oil, probably because the copper salt of the condensation product acts as a drier. Adherence to copper is extremely firm.

If it be desired to obtain preferential adherence to metal in a water-soluble colored condensation product, this result can be achieved by reacting one acidic group of the condensation product with a metallic compound which will render the condensation product water soluble, as for example sodium, potassium, or ammonium hydroxide, while reacting another acidic group with a basic dyestuff, and leaving still another acid group or other acidic groups uncombined. Thus in linseed oil two ethylene linkages are satisfied with maleic anhydride groups, thus rendering four acidic groups available (two for each maleic anhydride nucleus), and a basic dyestuff is added in quantity sufficient to satisfy one acidic group, and sodium hydroxide is introduced in quantity sufficient to satisfy another acidic group, while the remaining acidic groups are left free to combine with small amounts of drier metals as noted above and to maintain preferential adherence to metals.

EXAMPLE 8

The maleic anhydride condensation product of linseed oil, containing 15% of maleic anhydride with respect to the quantity of oil, and made for example according to the procedure outlined in Example 1, is treated with sufficient sodium hydroxide to form the sodium acid salt and then part of the remaining acidic groups are neutralized by a basic dyestuff. This sodium-basic-dyestuff-acid salt is then dissolved in water, preferably hot and close to the boiling point. From 10% to 20% of the sodium-basic-dyestuff-acid salt may be satisfactorily dispersed.

The water dispersion of the colored oil is very effective as a dip to apply a "shop coat" to metallic pipe, structural pieces, rolled sections, etc. to prevent corrosion until field painting or to form a base coat for any commercial paint or for one of the paints produced in accordance with the present invention.

This sodium-basic-dyestuff-acid salt of the maleic condensation product of linseed oil shows the usual drying properties as already noted and is considerably cheaper than oil vehicle paints as it can be applied in water dispersion. Any alkali forming a soluble salt such as sodium, potassium or ammonium hydroxide or an organic base such as triethylamine may be used. When ammonium hydroxide is employed, it is somewhat volatile and when the ammonia evaporates the film is rendered insoluble in water. Of course the emulsion of ammonium-basic-dyestuff-acid salt cannot be boiled indefinitely without adding ammonia.

An important property of the paint of the present invention is that cellulose ester lacquers adhere very firmly to tne dried film. This is due to the miscibility of nitrocellulose, ethyl cellulose, cellulose acetate, etc., with the oily condensation product. Of course other paints and lacquers beside nitrocellulose may be used for subsequent coats.

The colored condensation product of the present invention will in many instances comprise the entire paint, varnish, or lacquer. In other words, in many instances no pigment and no thinner and in some cases no drier need be used. In many cases the colored condensation product in the present invention will form the non-volatile part of the vehicle, or an ingredient of the non-volatile part of the vehicle, in a paint containing pigment.

The acidic colored condensation product of the present invention, resulting, for example, from condensation of the maleic anhydride with linseed oil and only partial saturation of the acidic groups, imparts superior leveling properties when used as part of the paint vehicle or as the entire vehicle. To an uninformed person, the product of the present invention when so used appears to behave as an enamel rather than a paint, apparently due to the dispersing action, which causes the superior leveling and improved wetting properties for pigment also.

When the colored condensation product of the present invention dries as a film, the film has a hardness greater than the film produced under similar conditions using raw linseed oil, for example. A relatively small amount of the product of the invention when used in the vehicle increases the resistance of the resulting film to accelerated weathering tests.

A thoroughly dried film of the colored condensation product of the present invention has better resistance both to cold and boiling water than a similar film of the drying oil from which the condensation product was made, for instance linseed oil.

The mixing of pigment with vehicles can be greatly facilitated by virtue of the superior wettability of the colored condensation product of the present invention for pigment. The condensation product obtained in Example 7, for instance, has a preferential adhesion to pigment. This property may be employed by pre-mixing the colored condensation product of the present invention with the pigment and then adding the remainder of the vehicle which may simply be raw or refined linseed oil. Superior mixing with pigment is also obtained even though the colored condensation product and the remainder of the vehicle are mixed together before being incorporated with the pigment. The time required for mixing with basic pigments such as zinc oxide is much reduced, and the power required for grinding the pigment in the vehicle is also cut down.

The colored condensation product of the present invention, resulting, for example, from the reaction of the maleic anhydride-linseed oil condensation product with insufficient basic dyestuff to saturate all acidic groups, increases the permanence of the suspension of pigment in the vehicle, particularly with such pigments as white lead and zinc oxide, but also with titanium oxide and lithopone. It is also possible to use the colored condensation product of the present invention to increase the pigment content which can be carried by the vehicle and thus obtain greatly increased film strength of the paint and increased resistance to ultra-violet light.

The colored condensation product of the present invention also assists in obtaining controlled penetration when painting permeable material such as wood. In other words, with the colored condensation product of the present invention the tendency of the vehicle to penetrate far into the wood, leaving the pigment at the surface with a depleted vehicle content or without any vehicle, is greatly reduced.

In paints, it will be understood that the colored condensation product of the present invention may desirably be employed not only to give color but to give a "tinge" or "cast" of color or to counteract an adverse "tinge" or "cast." For example, in a white paint which has a tendency to yellowness, a slight blue cast can be given to the vehicle by a blue basic dyestuff combined with the maleic anhydride condensation product of the present invention to counteract the tendency to a yellow cast in the paint.

It will be understood that any acidic groups of the condensation product which are not satisfied by reaction with the basic dyestuff may be used to form salts to advantage in particular cases.

A very desirable feature of the invention is the ability to produce colored dispersing agents for dispersing solids and emulsifying liquids. I have discovered that such a desirable dispersing agent may be obtained by producing a soluble acid salt of the reaction product of a basic dyestuff with the condensation product of maleic anhydride or the like and a nonconjugated unsaturated nonhydroxylated fatty acid or the like having from ten to twenty-four carbon atoms in its carbon chain.

EXAMPLE 9

Beginning with the condensation product of any one of Examples 1 to 5 inclusive, sufficient basic dyestuff is added to bring out the desired color, but not sufficient to satisfy all acidic groups, and then some or all of the remaining acidic groups are neutralized by a base such as an alkali metal base, for instance potassium or sodium hydroxide, or an organic base, for instance triethylamine. This complex basic dyestuff compound and salt of an alkali metal base or organic base, is water soluble and forms a satisfactory dispersing agent, whether or not the salt is a completed salt or an acid salt. If there are in the colored salt, acidic groups which are not reacted, they may if desired be esterified without destruction of the water solubility. The material of Example 8 may be used for dispersing or further neutralized to produce a completed salt or salt ester.

It will be understood of course that the order of reaction with the basic dyestuff and the alkali metal base or organic base is not critical and that the alkali metal base or organic base may react with the condensation product before the reaction with the basic dyestuff takes place.

The colored emulsifying agent consisting of the reaction product of the maleic-linseed condensation product with a basic dyestuff and with an alkali metal base or organic base, with the excess acidic groups preferably esterified, makes a very desirable acid or neutral emulsifying agent to emulsify other oils, fats and waxes, because of the desirable high stability, wettability, solubility and dispersive power of the dispersing agent. In these latter respects the dispersing agent is superior to sulphonated oils, and possesses the further advantage over sulphonated oils that decomposition is less likely to take place and acid groups are not liberated upon decomposition. In fact, the product just referred to may replace sulphonated oils for dispersing, wetting and softening agents in the textile, leather, paper, plaster and cement industries.

My novel colored dispersing agent may be used to produce dispersions of carnauba wax in water, of petroleum hydrocarbons in water and of many vegetable oils such as linseed, olive, neat's foot, castor, etc., in water. My new colored dispersing agent is also very desirable as a bodying agent in the making of polishes, cutting fluids and cosmetics.

EXAMPLE 10

To 200 parts by weight of the viscous oil obtained by the interaction of maleic anhydride and olive oil under the conditions described for instance in Example 1 (one molecular equivalent of maleic anhydride to one molecular equivalent of olive oil) are added one part by weight of Victoria blue dye base in 10 parts by weight of hot toluene. After thorough mixing for about half an hour at say 100° C., the product is neutralized with the theoretical amount of base, preferably sodium or potassium hydroxide in concentrated aqueous solution. The resultant oily product is miscible with water in all proportions and is likewise miscible with fatty oils and petroleum hydrocarbons. The basic dyestuff compound and salt as prepared above may be added to any suitable fatty oil or petroleum hydrocarbon to produce dispersion.

If desired the acidic basic dyestuff compound of the condensation product may be added to the disperse phase before neutralization and neutralization may be accomplished in the presence of the disperse phase.

EXAMPLE 11

To a water-insoluble hydrocarbon, alcohol or fatty oil, such as olive oil, castor oil, etc., or a wax such as carnauba or candelilla, the soluble colored condensation product of the last example is added until the dispersing agent forms 20% of the mixture. This mixture is readily emulsified with water due to the presence of the water soluble emulsifying agent, and will remain in suspension over an indefinitely long period of time.

If the water-soluble colored oil as obtained in the present example is boiled with water for 1 to 5 hours, the product is not decomposed with the concommitant separation of oil.

Prior to dispersing the colored salt of the condensation product of an acyclic olefinic acid having less than ten carbon atoms in its carbon chain with a nonconjugated unsaturated nonhydroxylated drying oil or the like, resins may be incorporated in the condensation product and dispersed by the condensation product.

EXAMPLE 12

Prior to dispersing the sodium-basic-dyestuff salt of the condensation product of maleic anhydride and linseed oil, or equivalent materials, ester gum is dissolved in the condensation product up to about one-half the limit of solubility. The colored solution of ester gum in the condensation product is then dispersed in water. Other paint, varnish and lacquer resins, for example a phenolic condensation product, may similarly be dissolved in the salt-basic-dyestuff compound of the condensation product of the present invention and then dispersed.

A colored insoluble coating may be obtained by the present invention which has utility because of its water-resistant properties. The insoluble colored acid salts of the maleic anhydride condensation product of linseed oil are generally viscous liquids while the completed salts are of jellylike or cheesy consistency.

EXAMPLE 13

The maleic anhydride condensation product of linseed oil is treated with a basic dyestuff as in Example 8 to form an acid basic dyestuff compound, and the acidic groups are partially neutralized by calcium to form the calcium-basic-dyestuff compound. This oily material may be applied as a coating for lining cans and other containers in which food is shipped. It dries as a colored water-resistant film of moderate hardness. Xylene may be used as a thinner. If desired, the completed salt may be used rather than the acid salt.

Where food is not to be encountered the lead, barium and aluminum basic dyestuff salts may be dissolved in suitable solvents to form varnishes of very high resistance.

Very satisfactory oil soluble driers may be manufactured by causing the basic dyestuff acidic compound of the condensation product of an acyclic olefinic acid or acid anhydride having less than ten carbon atoms in the carbon chain and a nonconjugated unsaturated nonhydroxylated aliphatic acid and the like having from ten to twenty-four carbon atoms in the carbon chain, particularly a glyceride of such acid, to react with a metallic oxide, hydroxide carbonate or similar compound capable by combining with free acid groups of the condensation product. For example, the oxides, hydroxides and carbonates and acetates in the presence of water, and many other salts, of lead, cobalt or manganese may be caused to react with the acid basic dyestuff compound of the maleic anhydride condensation product of linseed oil prepared as described in Example 6, to form driers that are readily soluble in linseed oil and very useful in the paint, varnish and lacquer industry.

A desirable feature of my invention is that the colored condensation product of maleic anhydride with nonconjugated unsaturated nonhydroxylated drying oils forms an excellent ingredient for a vehicle for paints, etc. This acid colored condensation product reacts with metallic oxides and hydroxides, and with carbonates and acetates in the presence of water, to form a drier which is chemically combined with the vehicle.

Such a drier is made by adding a small percentage of lead oxide to the maleic anhydride condensation product of linseed oil after it has reacted with a basic dyestuff to partially neutralize the acidic groups. The quantity of lead may for example be one-half percent of the total weight of the condensation product.

The presence in the oil of a strongly basic dyestuff increases the difficulty of drying, and necessitates the use of more drier in certain cases.

Of course ordinary soluble driers can be used instead of driers combined with the acidic groups. The colored condensation product of a drying oil dries in air at ordinary temperature to form films whether or not driers are used. Likewise the colored condensation product of a nonconjugated unsaturated nonhydroxylated fatty oil generally exhibits thermohardening properties, being convertible at 70° C. to 80° C. for example into a hard resistant varnish-like film in a short period of time. Where nonconjugated unsaturated nonhydroxylated fatty oils are used which contain relatively large proportions of oleic acid, such as sunflower, soya and safflower, the condensation products do not dry so readily as the condensation products obtained from the more active drying oils such as linseed oil. An example of the drying behavior of the colored condensation product is as follows:

EXAMPLE 14

A 1:1 xylene solution of the reaction product obtained in Example 6 to which soluble driers are added to the extent of 0.03% of cobalt, 0.05% of manganese and 0.5% of lead, for example in the form of linoleates or resinates, dries to a hard film at room temperature at about 5 hours and may be stoved to a hard film in about 1½ hours. The film produced is not acted upon by water, ethyl alcohol, benzene or xylene.

The colored condensation product may be esterified if free acidic groups remain, using either an aliphatic or aromatic alcohol and one which is either mono-, di- or poly-hydric. The esterified condensation product in which the maleic acid or acid anhydride or similar compound has combined with the grouping of a nonconjugated unsaturated nonhydroxylated fatty drying oil, and then the condensation product has reacted with a basic dyestuff, exhibits the same desirable air drying and thermohardening properties as the unesterified condensation product, and may be used for paint, varnish and lacquer work with success.

EXAMPLE 15

A typical case of esterification is exhibited when 200 parts by weight of the viscous oil obtained by the interaction of maleic anhydride and linseed oil as described in Example 1 are mixed with one part by weight of Victoria blue dye base dissolved in 10 parts by weight of toluene and the reaction product is mixed with 8 parts by weight of ethylene glycol and the mixture maintained at about 180° C. until the reaction ceases. A 1:1 xylene solution of the reaction product, when treated with a suitable quantity of metallic driers as described in Example 14 dries to a hard film in a relatively short time and can be stoved to a hard film at 80° C. in a few hours.

For varnishes the reaction product should preferably be incorporated with a resin such as rosin. This mixture may be heated to required varnish viscosity and then thinned with a suitable organic solvent.

EXAMPLE 16

Heat together 100 parts by weight of the colored maleic anhydride condensation product as obtained in Example 6 and 10 parts by weight of glycerine at 230° C. until a drop of the reaction mixture remains clear on cold metal. Then add to the reaction mixture 60 parts by weight of wood rosin and heat at 285° C. for 45 minutes. This product, when cut with petroleum spirits containing driers, dries to a water-resistant film.

Without limiting myself to any exact structure for the condensation product, it would appear that the condensation product is an addition product at a double bond in the carbon chain of the nonconjugated unsaturated nonhydroxylated fatty acid or the like, of the condensable olefinic compound or the like. For example, if linolenic acid reacts with maleic anhydride, the first stage in the reaction appears to be in general as follows. Of course if enough maleic anhydride be present, the same reaction will take place at each double bond in the linolenic acid.

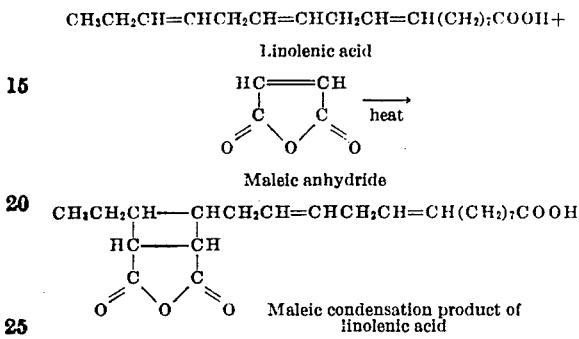

The iodine value of the condensation product confirms the above formula, and indicates that the ethylene linkage of the olefinic compound (in this case maleic anhydride) has been lost during condensation. It should be noted that one of the double bonds in linolenic acid and the ethylene linkage in maleic anhydride appear to have disappeared in the condensation product forming a ring type compound with four carbon atoms in the ring.

The condensation product appears to be characterized by the linkage:

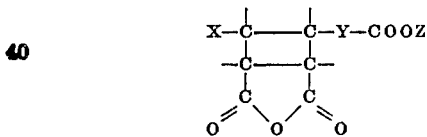

where X and Y are carbon chains without conjugated double bonds and Z is a hydrogen atom, a metal or an ester group.

The reaction above will be modified in well known manner if a glyceryl ester of linolenic acid instead of linolenic acid be used, or if some other nonconjugated unsaturated nonhydroxylated aliphatic acid having between ten and twenty-four carbon atoms in the carbon chain be employed or if some other acyclic olefinic acid, acid anhydride, half ester, or alkyl derivative thereof, each having less than ten carbon atoms in its carbon chain, be used instead of or in mixture with maleic anhydride.

It will be evident that the present invention makes it possible to increase tremendously the property of firm adherence to metal and firm adherence to special lacquer films of colored coatings. The present invention also makes possible the production of colored water dispersions and colored water soluble compounds of the condensation product.

Throughout the specification and claims, where I refer to nonconjugated unsaturated nonhydroxylated aliphatic acids having from ten to twenty-four carbon atoms in the carbon chain, I mean such acids as are unoxidized or nonpolymerized or not sufficiently oxidized or polymerized to interfere with the reactions disclosed herein. Likewise when I refer to salts of nonconjugated unsaturated nonhydroxylated aliphatic acids, I mean such salts as are unoxidized or nonpolymerized or not sufficiently oxidized or polymerized to interfere with the reactions disclosed herein. Likewise when I refer to esters of nonconjugated unsaturated nonhydroxylated aliphatic acids, I mean such esters as are nonoxidized or nonpolymerized or not sufficiently oxidized or polymerized to interfere with the reactions disclosed herein. Thus, in referring to linseed oil, I mean the product generally known as such, raw or refined, and not linseed oil sufficiently oxidized or polymerized to prevent or seriously interfere with the formation of a condensation product at a double bond. In other words, I do not intend to exclude others from mere esterification of oxidized or polymerized fatty oils by maleic anhydride.

Many of the fish oils contain varying percentages of fatty alcohols, which will of course react with maleic anhydride to form esters. The esterified fatty alcohols may be allowed to remain in the condensation product, or the alcohols may be removed before condensation takes place.

Where reference is made to poly-hydric alcohols, it is intended to include di-hydric alcohols. Under the designation poly-hydric alcohols, it is intended to include substituted poly-hydric alcohols such as glycol monoethyl ether. Reference to acids is intended to include acid anhydrides and half esters of acids. Reference to esters is intended to include partially completed esters such as half esters.

It will be understood that the condensation of minute amounts of the olefinic compound with the nonconjugated unsaturated nonhydroxylated fatty compound will not appreciably change the character of the latter. In general, at least 1% (based on the weight of the condensation product) of the olefinic compound should be combined with the nonconjugated unsaturated nonhydroxylated fatty compound in the product to insure a distinctive character of the product.

While I prefer to react the basic dyestuff with the condensation product after the condensation product is formed, it will be understood that to less advantage the basic dyestuff may be reacted with the acyclic olefinic acid before condensation. The same may be done as to salt and ester formation.

In view of my invention and disclosure variations and modifications to meet individual whim or particular need will doubtless become evident to others skilled in the art, to obtain all or part of the benefits of my invention without copying the exact process or product described, and I, therefore, claim all such in so far as they fall within the reasonable spirit and scope of my invention.

Having thus described my invention, what I claim as new and desire to secure by Letters Patent is:

1. The process of producing a colored varnish ingredient, which comprises reacting an acyclic olefinic acid having less than ten carbon atoms in its carbon chain for a time sufficient to cause condensation at the olefinic linkage with one of the group consisting of nonconjugated unsaturated nonhydroxylated aliphatic acids having from ten to twenty-four carbon atoms in their carbon chains, nonhydroxylated soaps thereof and nonhydroxylated esters thereof with monohydric, di-hydric and tri-hydric aliphatic alcohols, at a temperature in excess of 150° C. and causing the condensation product to combine with a basic dyestuff.

2. The process of producing a colored condensation product, which comprises condensing an acyclic olefinic acid having less than ten carbon atoms in the carbon chain at an intermediate point in the carbon chain of one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, at a temperature between 150° C. and 300° C. and reacting a basic dyestuff with the acidic group introduced by the olefinic acid.

3. The process of forming a colored condensation product, which comprises condensing maleic anhydride with an oil predominantly consisting of glycerides of linoleic and oleic acid at a temperature between 150° C. and 300° C. and reacting the condensation product with a basic dyestuff.

4. The process of forming a colored varnish oil, which comprises condensing maleic anhydride at a point of unsaturation in the carbon chain of a nonconjugated unsaturated nonhydroxylated drying oil having from ten to twenty-four carbon atoms in the carbon chain, and causing the condensation product to combine with a basic dyestuff.

5. The process of producing a colored oily material, which comprises condensing maleic anhydride with linseed oil, and reacting the condensation product with a basic dyestuff.

6. The process of producing a colored condensation product, which comprises condensing an acyclic olefinic acid having less than ten carbon atoms in the carbon chain at an intermediate point in the carbon chain of one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, and reacting the olefinic acidic group with a basic dyestuff, the quantity of basic dyestuff being insufficient to saturate all acidic groups introduced by the olefinic acid.

7. The process of producing a colored condensation product, which comprises condensing an acyclic olefinic acid having less than ten carbon atoms in the carbon chain, at an intermediate point in the carbon chain of one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, and reacting acidic groups introduced by the olefinic acid in part with a basic dyestuff and in part with a metal compound.

8. The process of forming a colored condensation product, which comprises condensing an acyclic olefinic acid having less than ten carbon atoms in the carbon chain, at an intermediate point in the carbon chain of one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, at a temperature of between 150° C. and 300° C. and reacting acidic groups introduced by the olefinic acid in part with a basic dyestuff and in part with a drier metal compound.

9. The process of forming a colored condensation product, which comprises condensing an acyclic olefinic acid having less than ten carbon atoms in the carbon chain, at an intermediate point in the carbon chain of one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, at a temperature of between 150° C. and 300° C. and reacting acidic groups introduced by the olefinic acid in part with a basic dyestuff and in part with a base of the group which consists of alkali metal bases and organic bases.

10. A colored synthetic material comprising the condensation product of an acyclic olefinic acid having less than ten carbon atoms in the carbon chain and one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, combined with a basic dyestuff at an acidic group introduced by the olefinic acid.

11. A colored synthetic material comprising the condensation product of an acyclic olefinic acid having less than ten carbon atoms in the carbon chain and one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, in the proportions of about one molecular equivalent of each, combined with a basic dyestuff at an acidic group introduced by the olefinic acid.

12. A colored synthetic material comprising the condensation product of maleic anhydride and one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, combined with a basic dyestuff at an acidic group introduced by the maleic anhydride.

13. A colored varnish oil comprising the condensation product of an acyclic olefinic acid having less than ten carbon atoms in its carbon chain with a nonconjugated unsaturated nonhydroxylated drying oil having from ten to twenty-four carbon atoms in its carbon chain, and a basic dyestuff, the color being developed by the acidic character of the condensation product.

14. A colored oil comprising the condensation product of an acyclic olefinic acid having less than ten carbon atoms in the carbon chain and an oil predominantly consisting of glycerides of linoleic and oleic acids, combined with a basic dyestuff at an acidic group introduced by the olefinic acid.

15. A colored oil comprising the condensation product of maleic anhydride with an oil predominantly consisting of glycerides of linoleic and oleic acids, combined with a basic dyestuff at an acidic group introduced by the maleic anhydride.

16. A colored oil comprising the condensation product of maleic anhydride and linseed oil, combined with a basic dyestuff at an acidic group introduced by the maleic anhydride.

17. A colored synthetic material comprising the condensation product of an acyclic olefinic acid having less than ten carbon atoms in the carbon chain, at an intermediate point in the carbon chain of one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, with acidic groups introduced by the olefinic acid in part combined with a basic dyestuff leaving acidic groups free.

18. A colored synthetic material comprising the condensation product of an acyclic olefinic acid having less than ten carbon atoms in the carbon chain, at an intermediate point in the carbon chain of one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, with acidic groups introduced by the olefinic acid in part combined with a basic dyestuff and other such acidific groups combined with a metal.

19. A colored synthetic material comprising the condensation product of an acyclic olefinic acid having less than ten carbon atoms in the carbon chain, at an intermediate point in the carbon chain of one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, with acidic groups introduced by the olefinic acid in part combined with a basic dyestuff and other such acidic groups combined with a drier metal compound.

20. A colored synthetic material comprising the condensation product of an acyclic olefinic acid having less than ten carbon atoms in the carbon chain, at an intermediate point in the carbon chain of one of the group consisting of nonconjugated unsaturated nonhydroxylated aliphatic acids having from ten to twenty-four carbon atoms in their carbon chains, nonhydroxylated soaps thereof and nonhydroxylated esters thereof with mono-hydric, di-hydric and tri-hydric aliphatic alcohols, with acidic groups introduced by the olefinic acid in part combined with a basic dyestuff and other such acidic groups combined with a base of the class comprising alkali metal bases and organic bases.

21. The condensation product of an acyclic olefinic acid having less than ten carbon atoms in the carbon chain at the carbon chain of an oil predominantly consisting of glycerides of linoleic and oleic acids, having a corrective color tinge imparted by a basic dyestuff combined with the acidic group.

EDWIN T. CLOCKER.